United States Patent
Montgomery et al.

(10) Patent No.: US 10,514,905 B1
(45) Date of Patent: Dec. 24, 2019

(54) SYSTEM AND METHOD OF REMEDIATING AND REDEPLOYING OUT OF COMPLIANCE APPLICATIONS AND CLOUD SERVICES

(71) Applicant: ANACONDA, INC., Austin, TX (US)

(72) Inventors: Wallace Paul Montgomery, Austin, TX (US); Kale John Franz, Austin, TX (US); Crystal Ann Soja, Austin, TX (US); Michael Carl Sarahan, Austin, TX (US); Elizabeth Citlalli Winkler Bano, Austin, TX (US)

(73) Assignee: ANACONDA, INC., Austin, TX (US)

( * ) Notice: Subject to any disclaimer, the term of this patent is extended or adjusted under 35 U.S.C. 154(b) by 0 days.

(21) Appl. No.: 16/452,427

(22) Filed: Jun. 25, 2019

Related U.S. Application Data (60) Provisional application No. 62/828,950, filed on Apr. 3, 2019.

(51) Int. Cl.
| | |
|---|---|
| *G06F 9/44* | (2018.01) |
| *G06F 8/658* | (2018.01) |
| *H04L 29/06* | (2006.01) |
| *G06F 21/54* | (2013.01) |
| *G06F 21/10* | (2013.01) |

(52) U.S. Cl.
CPC .......... *G06F 8/658* (2018.02); *G06F 21/105* (2013.01); *G06F 21/54* (2013.01); *H04L 63/1433* (2013.01)

(58) Field of Classification Search
CPC ........ G06F 8/658; G06F 21/105; G06F 21/54; H04L 63/1433
See application file for complete search history.

(56) References Cited

U.S. PATENT DOCUMENTS

| | | | | |
|---|---|---|---|---|
| 5,754,860 A | * | 5/1998 | McKeeman | G06F 11/3684 714/E11.208 |
| 7,624,086 B2 | * | 11/2009 | Keith, Jr. | G06N 5/04 706/60 |
| 7,814,535 B1 | * | 10/2010 | Barile | H04L 63/1433 726/5 |
| 7,827,545 B2 | * | 11/2010 | Choe | H04L 63/101 717/168 |
| 7,975,286 B1 | * | 7/2011 | Fickey | H04L 63/20 726/1 |
| 8,065,712 B1 | * | 11/2011 | Cheng | H04L 63/105 726/1 |
| 9,088,615 B1 | * | 7/2015 | Avlasov | H04L 63/20 |
| 9,716,724 B1 | * | 7/2017 | Chennuru | H04L 63/1433 |
| 10,075,559 B1 | * | 9/2018 | Brox | H04L 63/1433 |
| 2005/0015622 A1 | * | 1/2005 | Williams | H04L 41/0853 726/4 |
| 2006/0164199 A1 | * | 7/2006 | Gilde | H04L 12/4641 336/234 |
| 2006/0179476 A1 | * | 8/2006 | Challener | H04L 63/20 726/4 |
| 2007/0033194 A1 | * | 2/2007 | Srinivas | G06Q 30/02 |
| 2007/0101432 A1 | * | 5/2007 | Carpenter | G06F 21/552 726/25 |

(Continued)

*Primary Examiner* — Adam Lee
(74) *Attorney, Agent, or Firm* — DLA Piper LLP (US)

(57) ABSTRACT

A system and method for remediating and redeploying out of compliance applications and cloud services uses integrated vulnerability information. The system and method may use Conda packages and compliance reports to perform the monitoring, remediation and redeployment.

21 Claims, 6 Drawing Sheets

(56) References Cited

U.S. PATENT DOCUMENTS

| | | | |
|---|---|---|---|
| 2007/0177615 A1* | 8/2007 | Miliefsky | H04L 29/06027 370/401 |
| 2007/0192867 A1* | 8/2007 | Miliefsky | H04L 63/20 726/25 |
| 2008/0307488 A1* | 12/2008 | Hammond, II | H04L 41/046 726/1 |
| 2009/0007264 A1* | 1/2009 | Chatterjee | G06F 21/577 726/22 |
| 2012/0290544 A1* | 11/2012 | Abuelsaad | G06F 16/215 707/694 |
| 2014/0317413 A1* | 10/2014 | Deutsch | H04L 9/3271 713/176 |
| 2014/0366082 A1* | 12/2014 | Agrawal | H04L 63/20 726/1 |
| 2015/0332277 A1* | 11/2015 | Bhosale | G06Q 30/00 705/317 |
| 2016/0088021 A1* | 3/2016 | Jayanti Venkata | G06F 8/60 726/1 |
| 2016/0259948 A1* | 9/2016 | Statchuk | G06F 21/6218 |
| 2016/0269441 A1* | 9/2016 | Savage | H04L 63/1433 |
| 2016/0308912 A1* | 10/2016 | Mulgaonkar | G06F 21/577 |
| 2017/0220289 A1* | 8/2017 | Arora | G06F 3/0604 |
| 2017/0244761 A1* | 8/2017 | Baukes | H04L 41/0816 |
| 2017/0330197 A1* | 11/2017 | DiMaggio | G06Q 30/018 |
| 2018/0018602 A1* | 1/2018 | DiMaggio | G06Q 30/018 |
| 2018/0205759 A1* | 7/2018 | Hosie | H04L 63/20 |
| 2019/0050596 A1* | 2/2019 | Barday | G06F 21/577 |
| 2019/0104156 A1* | 4/2019 | Barkovic | G06F 11/14 |
| 2019/0199754 A1* | 6/2019 | Hajost | H04L 63/20 |
| 2019/0207981 A1* | 7/2019 | Sweeney | H04L 63/20 |

* cited by examiner

SYSTEM AND METHOD OF REMEDIATING AND REDEPLOYING OUT OF COMPLIANCE APPLICATIONS AND CLOUD SERVICES

PRIORITY CLAIMS/RELATED APPLICATIONS

This applications claims the benefit under 35 USC 119(e) to U.S. Provisional Patent Application Ser. No. 62/828,950, filed Apr. 3, 2019, the entirety of which is incorporated herein by reference.

FIELD

The disclosure relates generally to software, cloud infrastructure, compliance, security and package management and in particular to remediation and redeployment of out of compliance applications and cloud services.

BACKGROUND

Security and IT teams have a difficult time ensuring that their deployed applications and cloud services are up to date and do not have compliance issues such as security vulnerabilities. Presently, there is no good way to track which software libraries (packages) are used in software running throughout the company, which versions of packages are being used, who is using these packages, if there are any compliance issues and how they may be updated/redeployed. The turnaround time for this process is critical as security issues are often reported publicly which gives potential hackers knowledge to infiltrate infrastructure within a company. Common Vulnerability and Exposures (CVEs) reports are examples of publicly available reports. The presence of out of compliance applications and cloud services in an enterprise poses a serious security risk and technical problem for the enterprise.

It is desirable to be able to track the software packages used by an enterprise and statistics about the packages being used. It is further desirable to be able to track which software packages in an enterprise are non-compliant and then update those non-compliant packages. None of the current solutions have all of these desirable characteristics or solve the technical problem identified above. For example, some systems, such as a Conda repository and Artifactory, provide package management and tracking systems, but not the other desirable aspects while CVE and other security reports provide security vulnerability data/reports, but not the other desirable aspects. Furthermore, systems, such as Anaconda Enterprise or Amazon/Google/Microsoft clouds provide platforms to (re)deploy applications and services but again fail to provide the other desirable aspects. Thus, it is desirable to provide a system and a method for remediating and redeploying out of compliance applications and cloud services that has the desirable characteristics identified above and solves the above described technical problem and it is to this end that the disclosure is directed.

BRIEF DESCRIPTION OF THE DRAWINGS

FIG. 5 illustrates an example of a CVE report for the open source NumPy program.

DETAILED DESCRIPTION OF ONE OR MORE EMBODIMENTS

The disclosure is particularly applicable to a system for remediating out of compliance applications for an enterprise using integrated vulnerability information and it is in this context that the disclosure will be described. It will be appreciated, however, that the system and method has greater utility since it can also be used to remediate and redeploy other pieces of software, such as cloud services, that may be non-compliant. The system and method solves the technical problem mentioned above by providing various features. For example, the disclosed system and method tracks software packages used, tracks who uses the packages, the package popularity and when they are used (package statistics) and which specific packages and versions are non-compliant. Furthermore, the system has the ability to update the non-compliant packages, halt the services running non-compliant packages and restart the services. These features of the disclosed system and method provide the technical solution to the above technical problem in a way that is not well known, conventional or routine in the IT security industry as described above. In addition to the security compliance examples set forth below, the system and method may be used to handle applications or cloud services that are out of compliance with respect to digital signatures (improper digital signature), upgrading to the latest version of software packages as they release automatically, software license-driven changes (where a particular version of the asset cannot be used or a particular asset cannot be used) or company specific white/black listing of software (an asset that is permissible to use or an asset that is no longer permissible to use).

Figure 1:
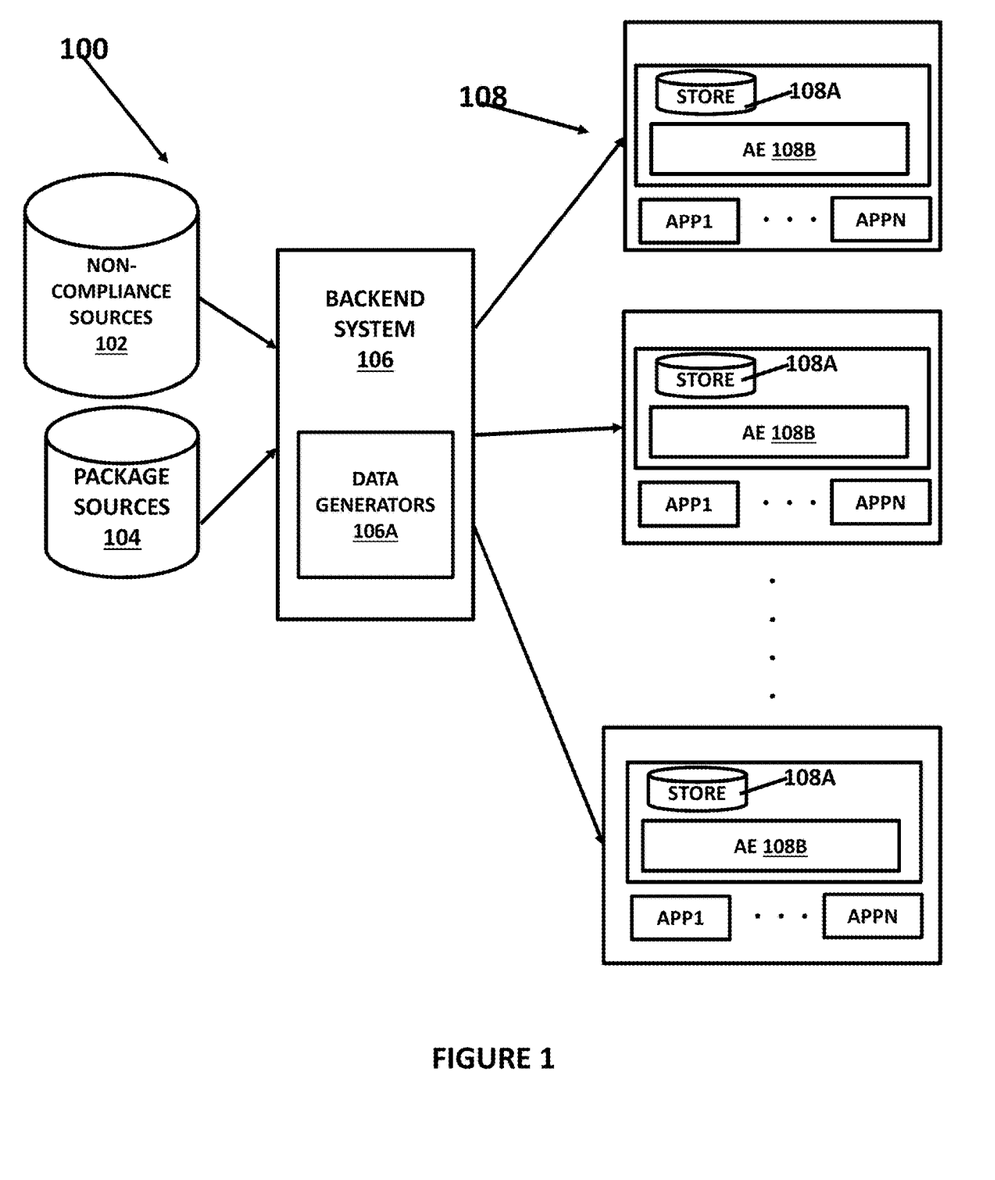
FIG. 1 illustrates an embodiment of a system for the remediating and redeploying of out of compliance applications and cloud services using integrated vulnerability information.

FIG. 1 illustrates an embodiment of a system 100 for the remediating and redeploying of out of compliance applications and cloud services using integrated vulnerability information. In one exemplary embodiment, the system 100 may be used to monitor and identify applications and/or cloud services that have security compliance issues and then resolve the security compliance issue. The security compliance issue may be resolved by shutting down the application or cloud service (and notifying the owner) if no fix is available or by replacing the application or cloud service with a new application or cloud service that is compliant and deploying the new application or cloud service. The system 100 may receive data from one or more non-compliant data sources 102 and data from one or more package sources 104. The non-compliant data sources may be data sources that identify non-compliant application or cloud services or a catalog that contains known security threats including vulnerabilities and exposures. The package sources may be package data sources with data about a plurality of packages, like NumPy in the example below, that may be part of a plurality of application or cloud services being used by the enterprise.

The data from the data sources may be fed into a backend system 106 that has one or more data generators 106A. The backend system 106 and the data generators 106A may be implemented as a plurality of computer systems (cluster hardware) that may be situated in the cloud and may perform the various functions and operations described below. For example, the cloud cluster hardware may include configurable cloud hardware from Amazon, Google or Microsoft and may include GPU-enabled nodes. The backend may also include secure conda hardware for generating the conda packages and an encryption module for digitally signing the data generated by the backend 106.

Each data generator 106A may generate one or more conda packages and/or one or more compliance reports based on the data sources 102, 104 and each is digitally signed. Each conda package may be package of data about a particular application or cloud service or about a particular packaged used in a particular application or cloud service. Each compliance report may be data about the status of the compliance for each of the applications or cloud services or packages that are installed/being used for a particular enterprise. The one or more conda packages and/or one or more compliance reports may be distributed from the backend 106 to one or more enterprise sites 108 whose applications and cloud services are being managed by the backend system 106. The data generators 106A may also generate CVE metadata.

Each enterprise site 108 may be a cluster of computer systems that execute or utilize one or more applications and/or one or more cloud services (or one or more packages) in connection with the operation of the enterprise site. Each computer system may be implemented using cloud resources, server computers, blade servers and the like. Each enterprise site 108 may have a store 108A (that may be implemented in hardware or software) that may store the distributed conda package(s) and the compliance reports.

Each enterprise site 108 may have an anaconda enterprise (AE) module 108B that is coupled to the store 108A and retrieves the distributed conda package(s) and the compliance reports. The AE module 108 may be implemented using on premises hardware that may be a cluster of any type of custom hardware on which the customer installs the AE engine 108B. For example, the AE module 108B may be installed on and implemented using GPU-enabled nodes. The AE engine 108B may utilize a software stack that may include Kubernetes, Docker, conda repo and Kafka. Each enterprise site 108 may also have one or more assets, such as applications or cloud services or packages, (APP1, . . . , APPN) that are monitored and controlled by the AE engine 108. The process and method described below works the same way for an application as for a cloud service.

While monitoring and controlling of the one or more assets (APP1, . . . , APPN), the AE engine 108 may track each asset, determine if/when each asset is out of compliance and perform remediation on each asset. For purposes of illustration, out of compliance means out of compliance from a computer security/malware/security threat standpoint, but the system may be used to track other types of compliance of the asset. During the remediation, the AE engine 108 may perform several action as described below. Note that each of the actions of the AE engine 108 are performed automatically based on the distributed conda packages and compliance reports so that the AE engine 108 can automatically keep each asset in compliance and handle any compliance issues as described below. The disclosed system 100 shown in FIG. 1 integrates vulnerability information and tracking of assets to permit the remediation of out of compliance assets in various manners.

Figure 2:
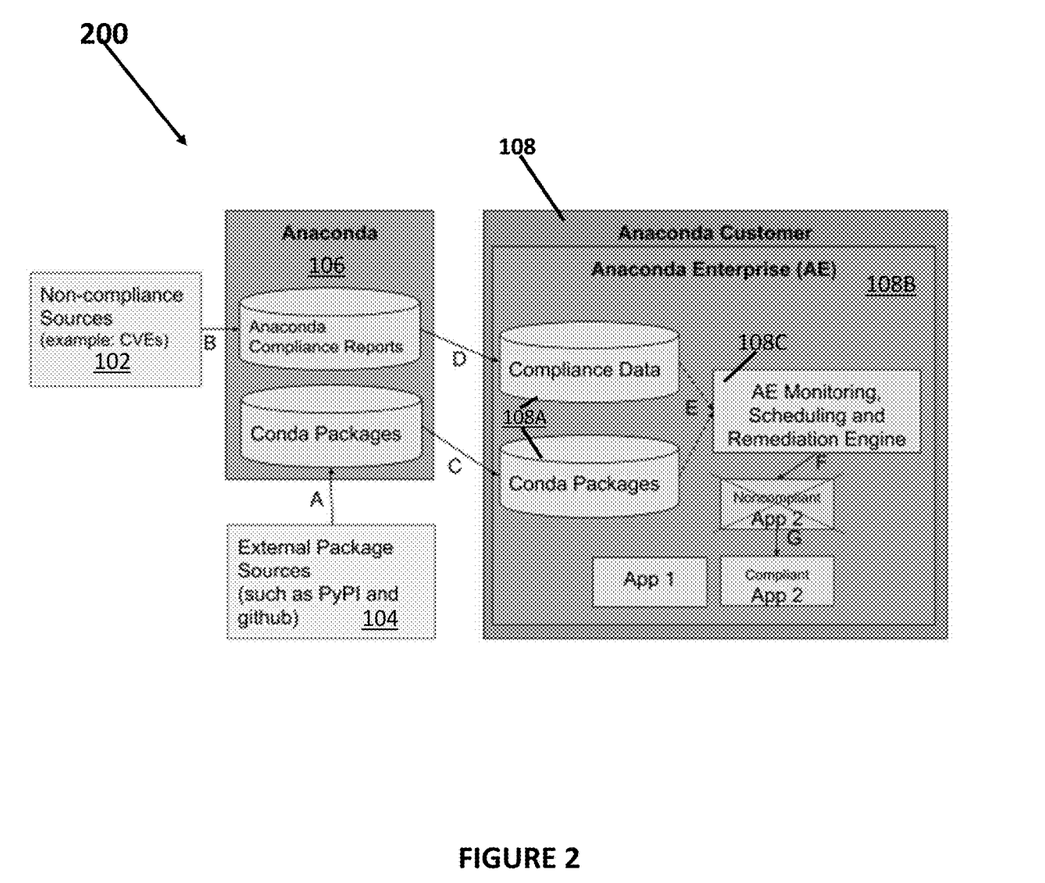
FIG. 2 illustrates an example of the system being used to remediate the out of compliance applications or cloud services for an enterprise.
Figure 3A:
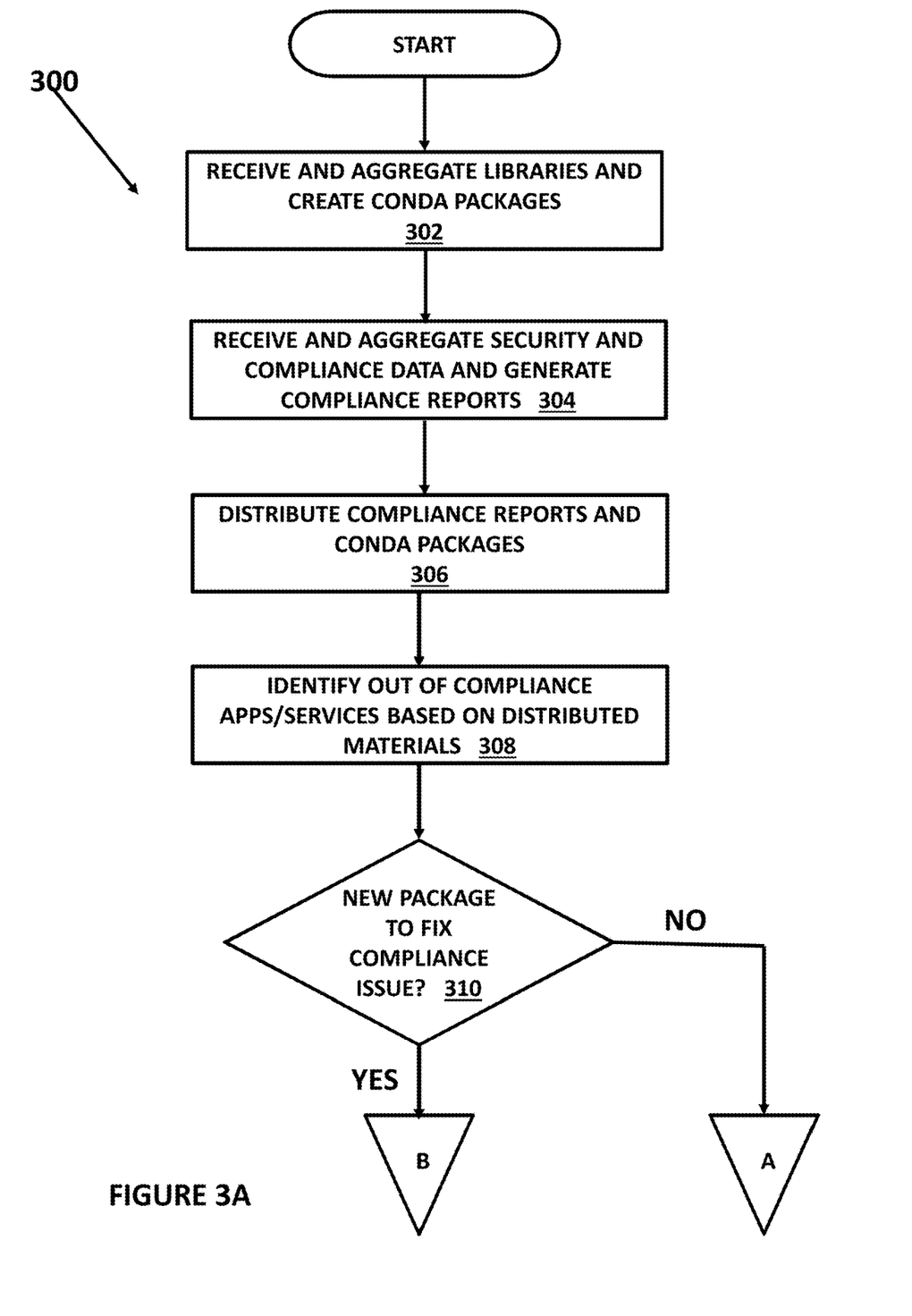
FIGS. 3A and 3B illustrate a method for remediation out of compliance applications or cloud services.
Figure 3B:
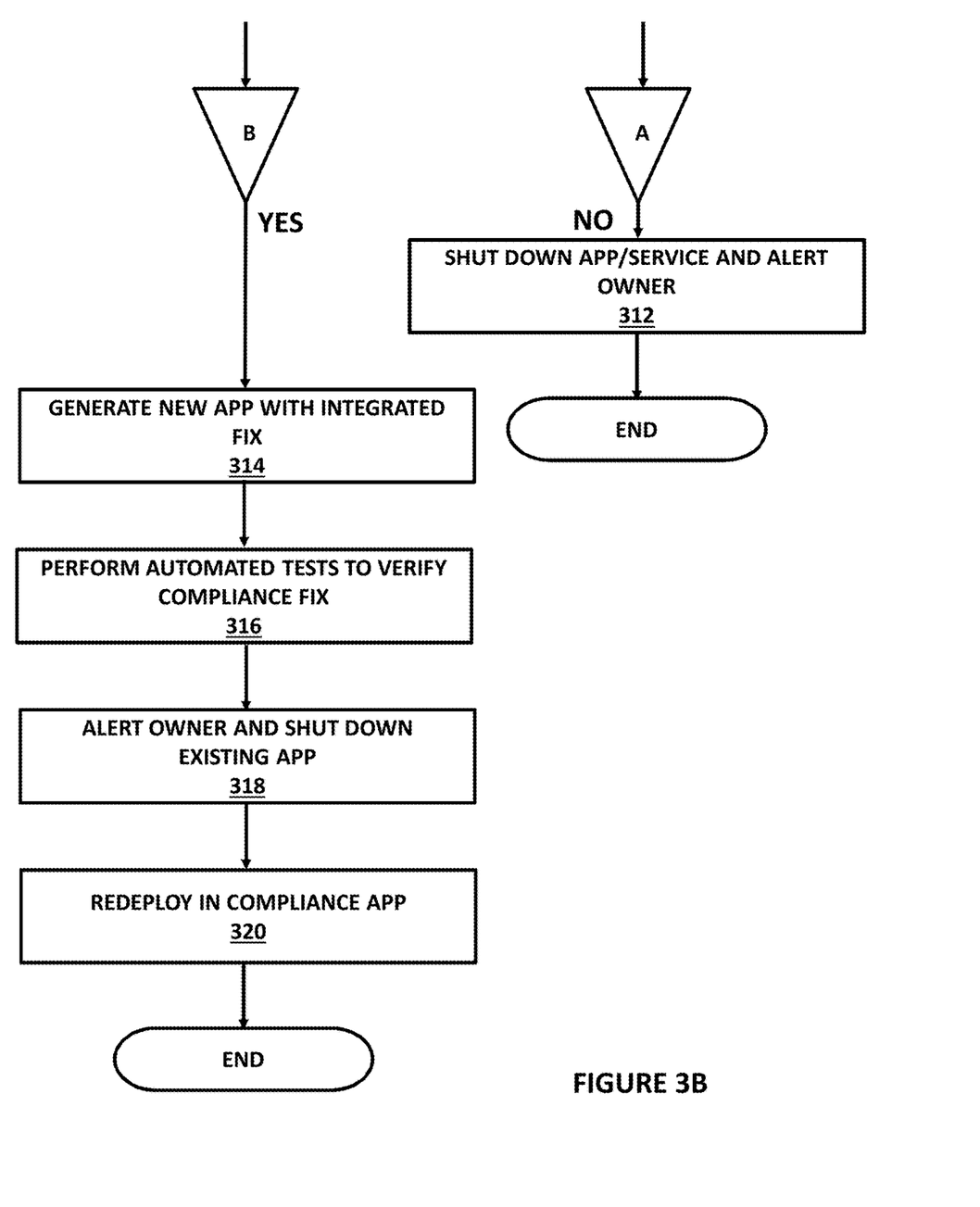

FIG. 2 illustrates an example of the system 200 being used to remediate the out of compliance applications or cloud services for an enterprise and FIGS. 3A and 3B illustrate a method 300 for remediation out of compliance applications or cloud services. In one embodiment, the method 300 may be performed using the system 200 in FIG. 2 although the method may be performed by other systems that are within the scope of this disclosure.

Figure 4:
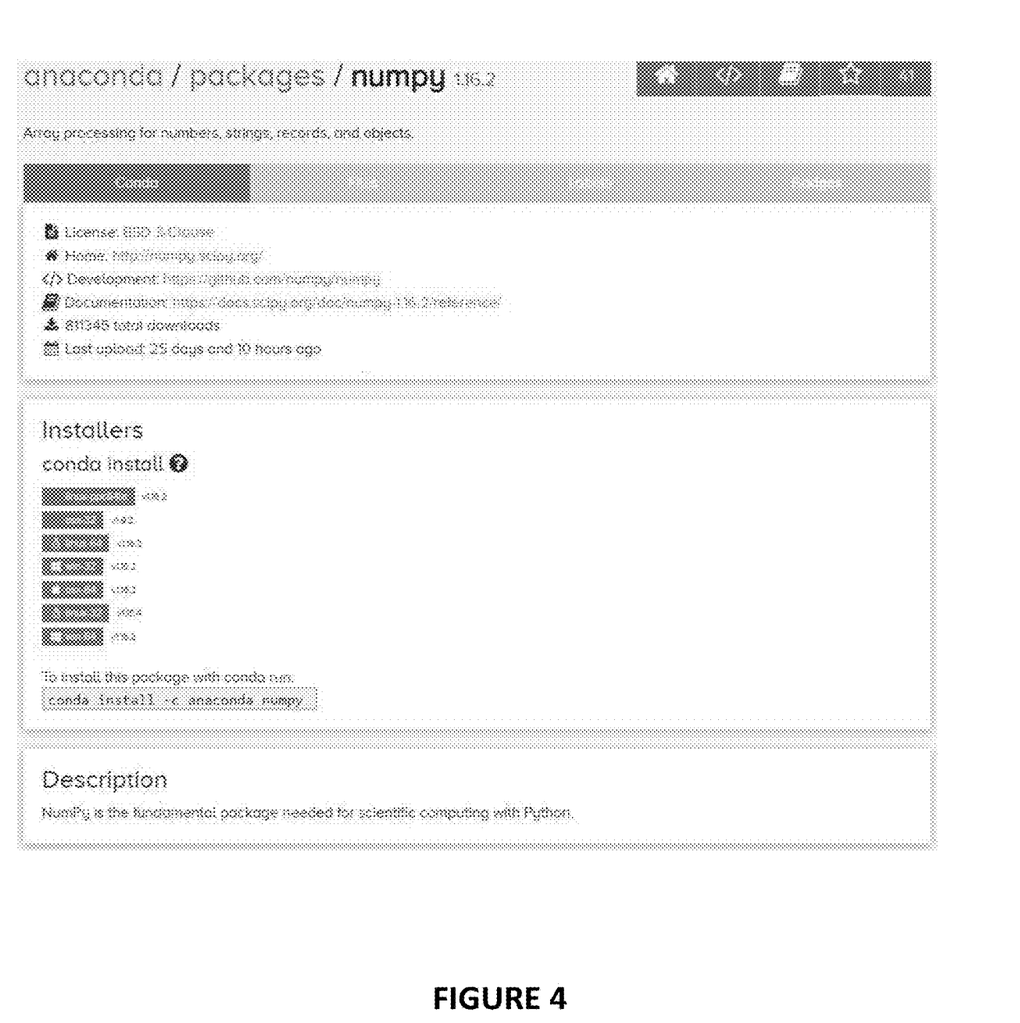
FIG. 4 illustrates an example of a conda package for an open source NumPy program.

The method begins by pulling and aggregating packages (libraries) from various sources 104 and creating conda packages from the sources (302). The process may be performed by the backend 106. Each conda package may be digitally signed to ensure that the authenticity of each conda package and the information contained in each conda package. In the embodiment shown in FIG. 2, the sources used to generate the conda packages may include PyPI and github. In an example below, a NumPy open source program is identified as an out of compliance application from a security standpoint. FIG. 4 illustrates an example of a conda package for an open source NumPy program. The digitally signed conda packages may be distributed to enterprise sites 108 and used, in part, to perform remediation and redeployment of out of compliance applications for cloud services at each enterprise site 108. The system may distribute thousands of conda packages and each of these packages may be used by various applications. For example, a single application may use many conda packages. For example, user application 1 may be comprised of packages such as NumPy, scipy, scikit-learn and many others along with custom user code and each package may be an asset whose compliance is monitored and an asset that can be remediated in the package is out of compliance.

The method may then pull in and aggregate security and compliance data from various sources (304). The process may be performed by the backend 106. Each compliance report may be digitally signed to ensure that the authenticity of each compliance report and the information contained in each compliance report. In this embodiment shown in FIG. 2, the sources used to generate the compliance reports may include Common Vulnerabilities and Exposures (CVE) catalogs which are each a catalog of known security threats. Each catalog is sponsored by the United States Department of Homeland Security (DHS), and threats are divided into two categories: vulnerabilities and exposures. In the example with the NumPy open source program, FIG. 5 illustrates an example of a CVE report for the same open source NumPy program and the report shows a score and the vulnerability types that may be used, in part, to determine if NumPy is out of compliance. The digitally signed compliance report may be distributed to enterprise sites 108 and used, in part, to perform remediation and redeployment of out of compliance applications for cloud services at each enterprise site 108. In one embodiment, each enterprise may configure its compliance reports (essentially which conda packages or software libraries are to be included in the compliance report) to the packages that they use and the report can be customized to focus on just the software the enterprise wants to monitor.

The method may then distribute the conda packages and compliance report together as a bundle (including security vulnerabilities) (306) to various sources including Anaconda Enterprise customer clusters 108. These may contain updates/fixes for packages with security vulnerabilities for example. In the embodiment in FIG. 2, the backend 106 may distribute the conda packages and Compliance report bundles to the plurality of enterprise sites 108.

The remainder of the method below is carried out at each enterprise customer site/cluster 108. In the embodiment in FIG. 2, the below method processes may be performed by the anaconda enterprise unit 108B and a monitoring, scheduling and remediation engine 108C that is part of the anaconda enterprise unit 108B which both may be implemented using on premises hardware that may be a cluster of any type of custom hardware on which the customer installs the AE module 108B and engine 108C. For example, the AE module 108B and engine 108C may be installed on and implemented using GPU-enabled nodes with a software stack that may include Kubernetes, Docker, conda repo and Kafka.

The AE engine 108C at each enterprise site 108 manages all of the applications and cloud services being executed at the particular enterprise site 108. As a result, the AE engine 108C has a record of all of the applications and cloud services being executed at the particular enterprise site 108 that the packages that may be part of each applications and cloud services.

Using the information about the applications and cloud services being executed at the particular enterprise site 108, the method may then identify out of compliance applications or cloud services for the particular enterprise site 108 based on the distributed materials (308). In more detail, in the embodiment in FIG. 2, the Enterprise monitoring, scheduling and remediation engine 108C processes the compliance reports and conda packages to understand which projects and deployed applications have compliance issues (such as security vulnerabilities) and if there is a new package which fixes the compliance issue. When the system sends the compliance reports and conda packages to the enterprise customer, the Anaconda Enterprise system 108B can look at historic customer usage of any packages that are flagged in the new incoming compliance report. At that time, if a new conda package is available that fixes the issue, the system may update the application. The output would be audit logs and alerts to application owners of the changes made. The result of this process 308 may be one or more applications/cloud services that are not out of compliance as shown in FIG. 2 and at least one application/cloud service that is out of compliance (noncompliant).

For each identified out of compliance application or cloud service, the method may determine if there is a new package to fix the compliance issues (310) wherein the new package is part of the materials that were distributed to each enterprise site 108 and the engine 108C in the example in FIG. 2. If it is determined that there is not a fix for the out of compliance application/cloud service, the method may shut down the out of compliance application/cloud service and alert the owner of the out of compliance application/cloud service or the entity site owner (312) and the method is completed for that particular out of compliance application/cloud service.

For each identified out of compliance application or cloud service, if it is determined that there is a fix for the out of compliance application/cloud service, the method may generate a new application that includes the fix (314). For example, in the AI model example below, the AI model may use the open source NumPy program and NumPy 1.16.0 (that is currently being used by the AI model) has a security vulnerability as described above. The system sends out a new version of NumPy (v1.16.2 for example) which fixes this CVE. The AE 108B can then take down the application with the old version of NumPy, rebuild it with the new package, run automated tests to verify that the application works properly and then redeploy it automatically. In one embodiment, the method may use the distributed conda packages for the particular application to "re-solve" the packages to integrate the fix. For example, the user may use the open source conda command line tool infrastructure to "re-solve" the packages that enables a user to update all of the packages in an application to the latest version of all packages and rebundle the application for execution or distribution.

The method may perform test to verify the compliance fix and that the fix does not impair the operation of the application/cloud service (316). In one embodiment, the method may execute automated tests to verify that the updated packages do not break the application. In the case of each entity, there may be particular tests that the entity uses to verify the updated packages. For example, a customer may use one of many test frameworks for their application. PyTest is a common publically available test. As another example, a continuous integration/continuous deployment (CI/CD) step may be called to perform all of these actions. Another example are unit tests that are the most likely tests but depending on customer sophistication/need, the system may run functional or integration tests (or any other type). Once the automated tests are passed, the out of compliance application/cloud service may be shut down and the owner notified (318). The application with the fix may then be deployed (320) that is not in compliance. The process for an out of compliance application/cloud service that is fixed is now complete and then method is started again for the next out of compliance application/cloud service.

The method processes 308-320 may be configured by an administrator to be automatic as soon as a new compliance data report is received. Alternatively, the processes 308-320 may be manually controlled by the admin or application owner. In another embodiment, the method may be configured to simply alert the application/cloud service owner and wait for the owner to provide instructions including fixing the application/cloud service and redeploying it as described above.

The system 200 shown in FIG. 2 can perform the method 300 in part because the AE module 108B tracks all packages used in each application/deployment, knows who owns each application and receives new packages/compliance reports necessary to trigger actions. The conda tool in combination with the conda repository allows recreation of application environments automatically.

First Example

In a first example, an enterprise customer is running anaconda enterprise 108B system and may have a deployed (instantiated and executing) artificial intelligence model which is making business decisions for the company. This AI model is composed of customer unique code and a set of open source packages. One of these open source packages may be NumPy which is used frequently in matrix math operations. In this example, the version of NumPy in use is 1.16.0.

An actual CVE (security vulnerability) report for this open source package was generated for this version. As shown in the CVE, the issue with NumPy is an 8.8 CVSS which is pretty severe and can allow a remote attacker to execute arbitrary code and could potentially allow this attacker to take control of the server running the customer's AI model.

Therefore, as soon as the CVE is generated, the system shown in FIGS. 1 and 2 will pull in this CVE information, verify, validity and create an Anaconda Enterprise (AE) compliance metadata package/report as described above. This package will be sent to all AE customers (and each entity site 108) and it will be automatically parsed and investigated by the AE module 108B running at the customer site. The engine 108C, based on the distributed compliance report, determines, from the compliance report and the information about the AI model being executed by the customer, that the AI model being executed by the customer is vulnerable and that the system sent out new versions of NumPy (in the conda packages) to customer AE clusters 108 already. For example, NumPy v1.16.2 (that resolves the out of compliance issue) is already been distributed to the AE module 108B at the customer site in this example. The AE engine 108C has the ability to take all of the AI model code and packages, replace NumPy v1.16.0 with v1.16.2, rebuild the model/application, run tests to verify that everything is working properly, take down the old AI model and redeploy/rerun with the updated version that is not vulnerable to attack.

Second Example

In a second example, same situation as described in the first example except that the package distributed to the AE 108B (like the open source NumPy code) is not digitally signed correctly from Anaconda. Thus, the package may be a hacked/untrusted version of the package and the system may replace the unsigned code with verified, signed code. If the system cannot replace the unsigned code with signed code, the AE 108B will not replace NumPy and redeploy an updated version, but will instead shut down the AI model with NumPy and inform the owner of the site 108 of the problem.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers,. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method, comprising:
   storing, in a backend computer system, one or more package reports and one or more compliance reports, wherein each package report comprises data about a corresponding asset and each compliance report comprises data about a corresponding enterprise site, wherein each enterprise site hosts one or more assets;
   receiving, at a particular enterprise site and from the backend computer system, the one or more package reports that correspond to the one or more assets hosted at the particular enterprise site and the compliance report that corresponds to the particular enterprise site;
   identifying an asset in the particular enterprise site that has an out of compliance issue based on the received package report corresponding to the identified asset and the compliance report, wherein the out of compliance asset has at least one portion of the asset that is not compliant with the corresponding package report and compliance report; and
   performing a remediation process on the out of compliance asset, wherein performing the remediation process comprises determining that a fix for the out of compliance asset is present in the package report for the out of compliance asset, generating an updated asset using the package report for the out of compliance asset wherein the updated asset includes the fix, shutting down the out of compliance asset, and deploying the updated asset in the particular enterprise site.

2. The method of claim 1, wherein performing the remediation process further comprises determining that the fix for the out of compliance asset is not present in the package report for the out of compliance asset and shutting down the out of compliance asset.

3. The method of claim 1, wherein performing the remediation process further comprises performing a test to verify the updated asset before the updated asset is deployed.

4. The method of claim 1, wherein the asset is one of an application, a cloud service, a package that is part of the application and a package that is part of the cloud service.

5. The method of claim 1, wherein the out of compliance issue is one of a security vulnerability issue, an automatic update to the asset, a digital signature, a security software license change and a company listing of an asset on one of a whitelist and a blacklist.

6. The method of claim 1, wherein each package report is a conda package and the method further comprising generating and digitally signing each conda package and generating and digitally signing each compliance report.

7. The method of claim 6, wherein generating each conda package further comprises aggregating one or more data sources to generate each conda package.

8. A system, comprising:
a backend computer system that stores one or more package reports and one or more compliance reports, wherein each package report comprises data about a corresponding asset and each compliance report comprises data about a corresponding enterprise site, wherein each enterprise site hosts one or more assets;
one or more enterprise sites with each enterprise site having a plurality of computers and one or more assets executing on the plurality of computers, wherein a monitoring and remediation engine is hosted at a particular enterprise site having a plurality of lines of instructions executed by a processor of one of the plurality of computers of the particular enterprise site configured to:
receive, from the backend computer system, the one or more package reports that correspond to the one or more assets hosted at the particular enterprise site and the compliance report that corresponds to the particular enterprise site;
identify an asset in the particular enterprise site that has an out of compliance issue based on the received package report corresponding to the identified asset and the compliance report, wherein the out of compliance asset has at least one portion of the asset that is not compliant with the corresponding package report and compliance report; and
perform a remediation process on the out of compliance asset, wherein the monitoring and remediation engine is further configured to perform the remediation process by determining that a fix for the out of compliance asset is present in the package report for the out of compliance asset, generating an updated asset using the package report for the out of compliance asset wherein the updated asset includes the fix, shutting down the out of compliance asset, and deploying the updated asset in the particular enterprise site.

9. The system of claim 8, wherein the monitoring and remediation engine is further configured to determine that the fix for the out of compliance asset is not present in the package report for the out of compliance asset and shut down the out of compliance asset.

10. The system of claim 8, wherein the monitoring and remediation engine is further configured to perform a test to verify the updated asset before the updated asset is deployed.

11. The system of claim 8, wherein the asset is one of an application, a cloud service, a package that is part of the application and a package that is part of the cloud service.

12. The system of claim 8, wherein the out of compliance issue is one of a security vulnerability issue, an automatic update to the asset, a digital signature, a security software license change and a company listing of an asset on one of a whitelist and a blacklist.

13. The system of claim 8, wherein each package report is a conda package and wherein the monitoring and remediation engine is further configured to digitally sign each conda package and generate and digitally sign each compliance report.

14. The system of claim 13, wherein the backend computer system aggregates one or more data sources to generate each conda package.

15. An enterprise site apparatus, comprising:
an enterprise site having a plurality of computers, one or more assets executing on the plurality of computers and a monitoring and remediation engine hosted at the enterprise site having a plurality of lines of instructions executed by a processor of one of the plurality of computers configured to:
receive, from a backend computer system, one or more package reports that comprise data about the corresponding one or more assets hosted at the enterprise site and a compliance report that comprises data about the enterprise site, each package report corresponds to a particular asset and the compliance report corresponds to the enterprise site, and the one or more assets being hosted at the enterprise site;
identify an asset in the enterprise site that has an out of compliance issue based on the received package report corresponding to the identified asset and the compliance report, wherein the out of compliance asset has at least one portion of the asset that is not compliant with the corresponding package report and compliance report; and
perform a remediation process on the out of compliance asset, wherein the monitoring and remediation engine is further configured to perform the remediation process by determining that a fix for the out of compliance asset is present in the package report for the out of compliance asset, generating an updated asset using the package report for the out of compliance asset wherein the updated asset includes the fix, shutting down the out of compliance asset, and deploying the updated asset in the enterprise site.

16. The apparatus of claim 15, wherein the monitoring and remediation engine is further configured to determine that the fix for the out of compliance asset is not present in the package report for the out of compliance asset and shut down the out of compliance asset.

17. The apparatus of claim 15, wherein the monitoring and remediation engine is further configured to perform a test to verify the updated asset before the updated asset is deployed.

18. The apparatus of claim 17, wherein the asset is one of an application, a cloud service, a package that is part of the application and a package that is part of the cloud service.

19. The apparatus of claim 15, wherein the out of compliance issue is one of a security vulnerability issue, an automatic update to the asset, a digital signature, a security software license change and a company listing of an asset on one of a whitelist and a blacklist.

20. The apparatus of claim 15, wherein each package report is a conda package and wherein the monitoring and remediation engine is further configured to digitally sign each conda package and generate and digitally sign the compliance report.

21. The apparatus of claim 20, wherein the backend computer system aggregates one or more data sources to generate each conda package.

* * * * *